United States Patent [19]

Tinsley

[11] Patent Number: 5,114,335

[45] Date of Patent: May 19, 1992

[54] MECHANICAL LOCKING MECHANISM FOR INJECTION MOLD

[75] Inventor: Jack A. Tinsley, Sylvania, Ohio

[73] Assignee: Hoover Universal, Inc., Plymouth, Mich.

[21] Appl. No.: 694,901

[22] Filed: May 2, 1991

[51] Int. Cl.⁵ .............................................. B29C 45/64
[52] U.S. Cl. ..................................... 425/577; 425/595; 425/DIG. 5
[58] Field of Search ................. 425/DIG. 5, 577, 595, 425/451.7

[56] References Cited

U.S. PATENT DOCUMENTS

| | | | |
|---|---|---|---|
| 2,363,107 | 7/1941 | Young | 425/451.7 |
| 4,184,835 | 1/1980 | Talbot | 425/577 |
| 4,737,093 | 4/1988 | Hori et al. | 425/595 |

Primary Examiner—Willard Hoag
Attorney, Agent, or Firm—Harness, Dickey & Pierce

[57] ABSTRACT

A mechanical locking mechanism for an injection mold is disclosed for holding a core rod in place in the mold cavity to resist movement caused by the injection molding pressures. The locking mechanism includes a pair of cam shafts, one carried by each of the mold halves, having a cam engagable with a concave recess in the core rod. When the mold halves are closed upon the core rod, the cams engage a portion of the recess surfaces facing toward the mold cavity. The cam shafts are subsequently rotated to move the cams to a second portion of the recess surfaces which is facing away from the mold cavity whereby the cams resist movement of the core rod away from the injection mold cavity.

5 Claims, 4 Drawing Sheets

MECHANICAL LOCKING MECHANISM FOR INJECTION MOLD

BACKGROUND AND SUMMARY OF THE INVENTION

The present invention relates to a locking mechanism for an injection mold and in particular to a locking mechanism for holding a core rod in place when injection molding a plastic preform thereon for subsequent blow molding to form a container.

Most containers blow molded from polyethylene terephthalate (PET) are made by first injection molding a preform over the end of a core rod. After injection molding the preform, two injection mold halves separate laterally from the core rod and the core rod carrying the preform is transferred to a blow mold where the preform is then blow molded into conformity with the blow mold cavity forming the finished product.

The preform is generally in the shape of an elongated hollow body open at one end and closed at the other end. The preform is molded by first closing two mold halves forming a cavity open at one end and placing a core rod in the cavity through the open end. A hollow space is formed between the core rod and the mold cavity corresponding to the desired shape of the preform. The plastic resin is typically injected into this space at the center of the closed end of the preform.

The neck finish at the open end of the molded container is completely formed during the injection molding of the preform. This neck finish, which typically contains the threads or other means for securing a closure to the container, is not later reshaped during the blow mold stage. As a result, the diameter of the preform open end is the same as the diameter of the finished container open end.

During the injection molding process, the resin pressure acts on the core rod in a direction to force the core rod from the mold cavity. As the diameter of the core rod increases, so does the force acting to move the core rod from the mold cavity. To properly mold a preform, it is necessary that the core rod remain stationary during injection molding.

Accordingly, it is an object of the present invention to provide a locking mechanism to prevent withdrawal of the core rod caused by the injection pressures.

The locking mechanism of the present invention provides a pair of cam shafts with one cam shaft carried by each mold half. The cam shafts extend parallel to the mating face of the two mold halves. When the mold halves close, eccentric cams carried by the cam shafts are positioned within recesses formed in the core rod above the open end of the preform. The cam shafts are then rotated to move the eccentric cams into a locking position within the recesses to prevent withdrawal of the core rod from the mold cavity. The cams and core rod recesses are configured such that the forces applied to the cams by the core rod act substantially radially through the cam shaft's rotational axes so as to create little or no rotational moment in the cam shafts tending to disengage the cams. Hydraulic cylinders are used to rotate the cam shafts into the lock position and only a minimal force is required to maintain the cam shafts in the lock positions during the injection molding process.

Further objects, features and advantages of the invention will become apparent from a consideration of the following description and the appended claims when taken in connection with the accompanying drawings.

DETAILED DESCRIPTION OF THE INVENTION

Figure 1:
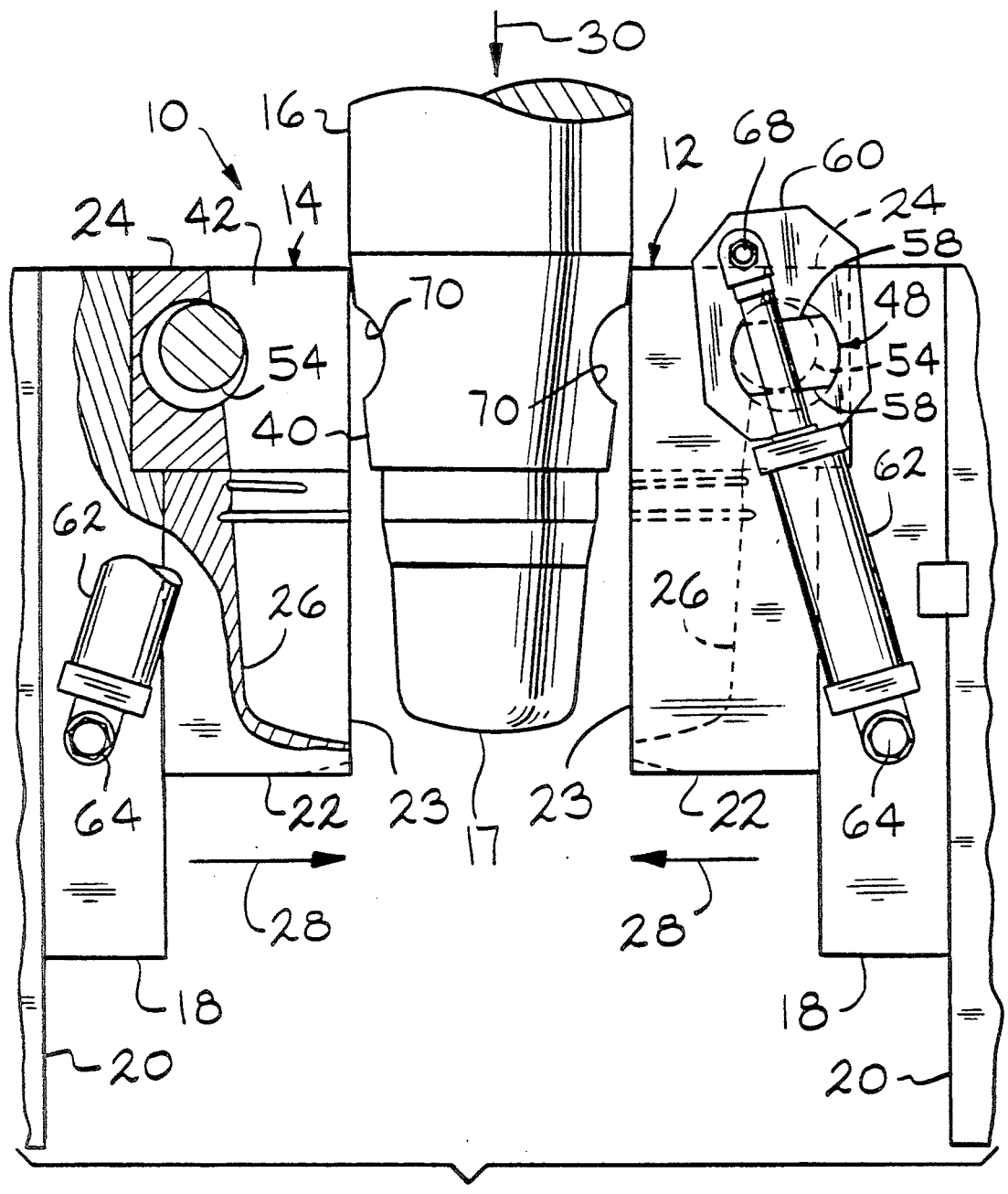
FIG. 1 is an elevational/sectional view of an injection mold in an open position containing the locking mechanism of the present invention.

The locking mechanism of the present invention is contained in an injection mold assembly 10 shown in FIGS. 1 through 4. Injection mold assembly 10 is comprised of two mold halves 12 and 14 and a core rod 16. Each mold half includes a permanent tooling 18 carried by a movable press platen 20 and a cavity block 22 and a core rod centering block 24 each mounted to the permanent tooling 18.

Each of the cavity blocks 22 has an inner surface 26 which forms one half of the injection mold cavity. In FIG. 1, the mold assembly is shown in an open position in which the two cavity blocks are laterally separated from one another. The mold assembly is closed by moving the two mold halves laterally in the direction of the arrows 28 as shown in FIG. 1.

After closing of the mold, the distal end 17 of the core rod 16 is moved into the space between the two mold halves by longitudinally moving the core rod in the direction of arrow 30. Upon closing the mold halves, the surfaces 26 of the two cavity blocks 22 and the core rod 16 form a hollow space 32. The space 32 corresponds to the shape of the desired preform having a side wall 34, a closed bottom wall 36 and an open upper end.

The core rod, above the mold cavity has a frusto-conical outer surface 40 which mates with the frusto-conical inner surface 42 of the core rod centering blocks 24. The surfaces are angled approximately 7° relative to the longitudinal direction or axial direction of the core rod and act to center the core rod 16 within the mold cavity to provide uniform wall thickness to the molded preform.

The preform is injection molded by an injection nozzle 44 which injects plastic resin through a sprue 46 into the space 32. The injection molding is performed at a resin pressure of several thousand pounds per square inch. The pressure acts upon the core rod 16 to move it longitudinally upward or out of the mold cavity. However, such movement of the core rod would result in an unsatisfactory preform. Accordingly, the mold 10 is provided with a locking mechanism to lock the core rod in place to prevent movement caused by the injection pressure.

The locking mechanism includes a cam 54 carried in each centering block 24. The core rod in turn includes a pair of concave recesses 70 forming cam surfaces for engagement with the cams 54. Cams 54 are a part of cam shafts 48 having bearing portions 50 that define an axis of rotation 52 for each cam shaft. Cams 54 are eccentric relative to the axes 52.

The recesses 70 have cylindrical concave surfaces that are concentric about the axes 52 of the cam shafts when the mold assembly is closed. The cams 54 are cylindrical in shape with a radially outermost surface radially spaced from the axes 52 a distance equal to the radius of the recesses 70. This results in line-to-line engagement of the cams with the recesses when the mold assembly is closed.

Figure 2:
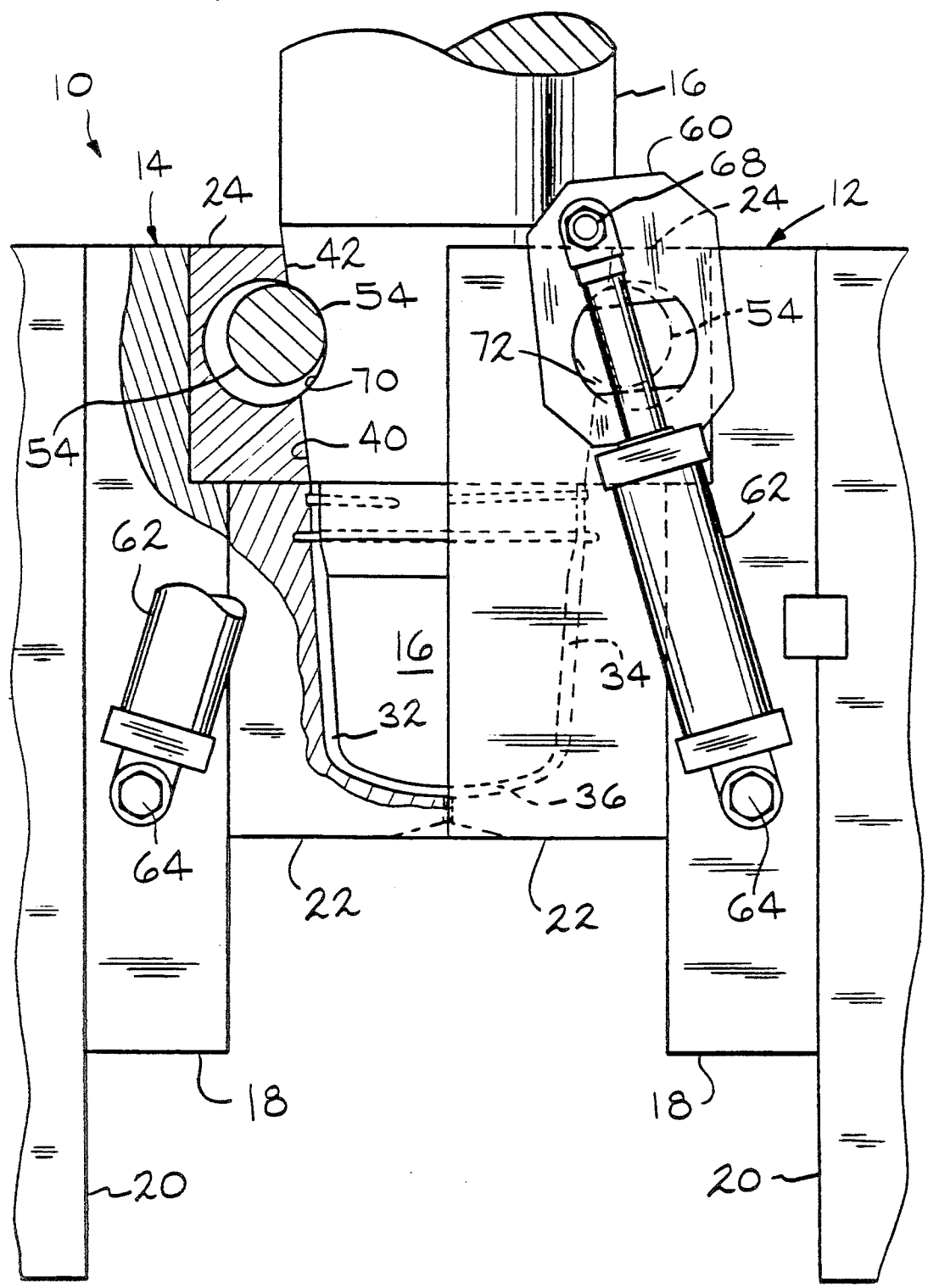
FIG. 2 is an elevational/sectional view similar to FIG. 1 showing the mold halves in a closed position.

When initially closed as shown in FIG. 2, the cams engage the recesses at an upper portion of the recesses which forms a downward facing surface, a surface facing in a direction toward the core rod distal end. This is a release position for the cams in which a space 72 remains between the cams and a lower portion of the recesses. In this position, the core rod is still able to move longitudinally out of the mold cavity.

Figure 3:
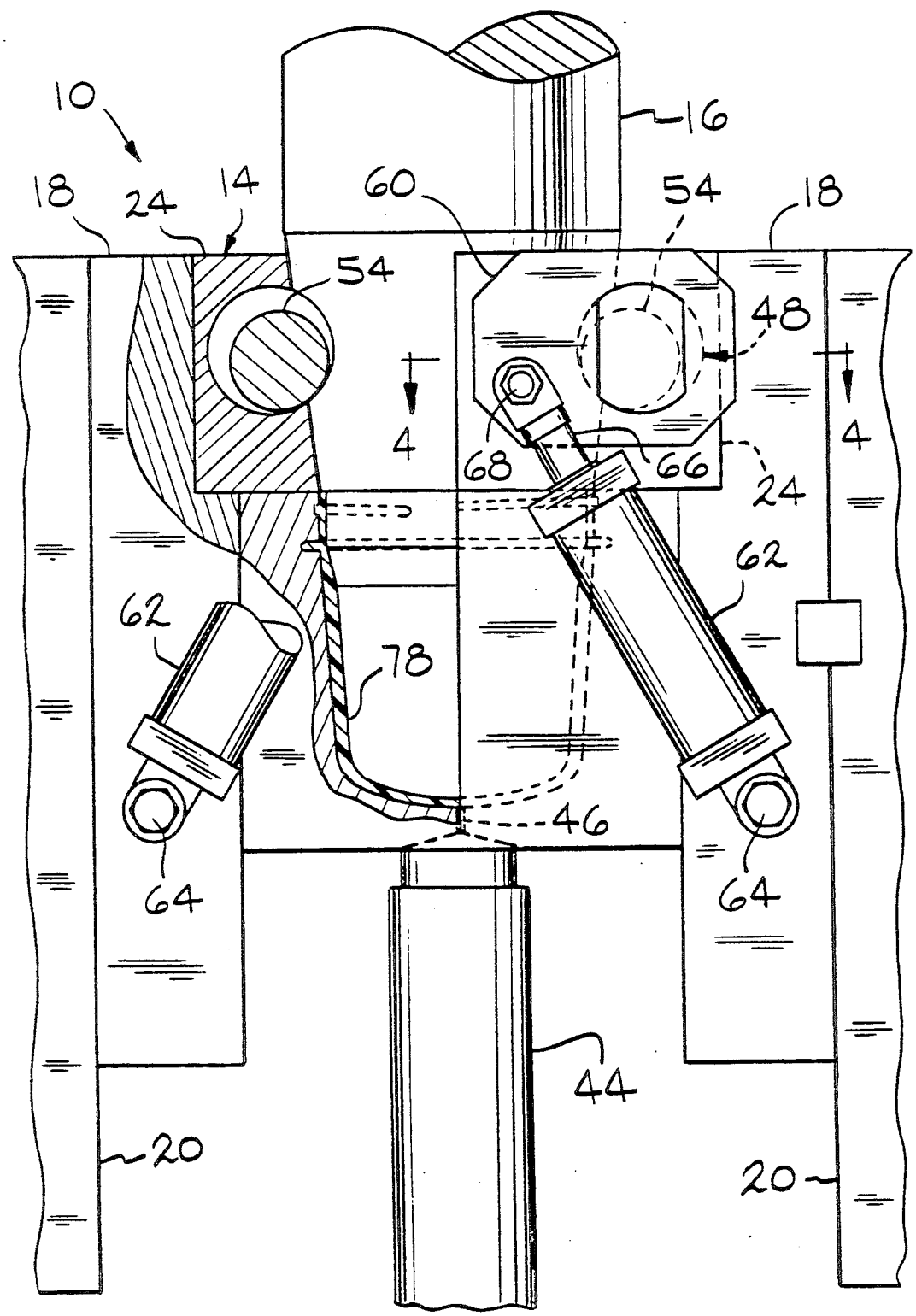
FIG. 3 is a elevational/sectional view similar to FIG. 2 with the molds in a closed position and the locking mechanism in a locked position.
Figure 4:
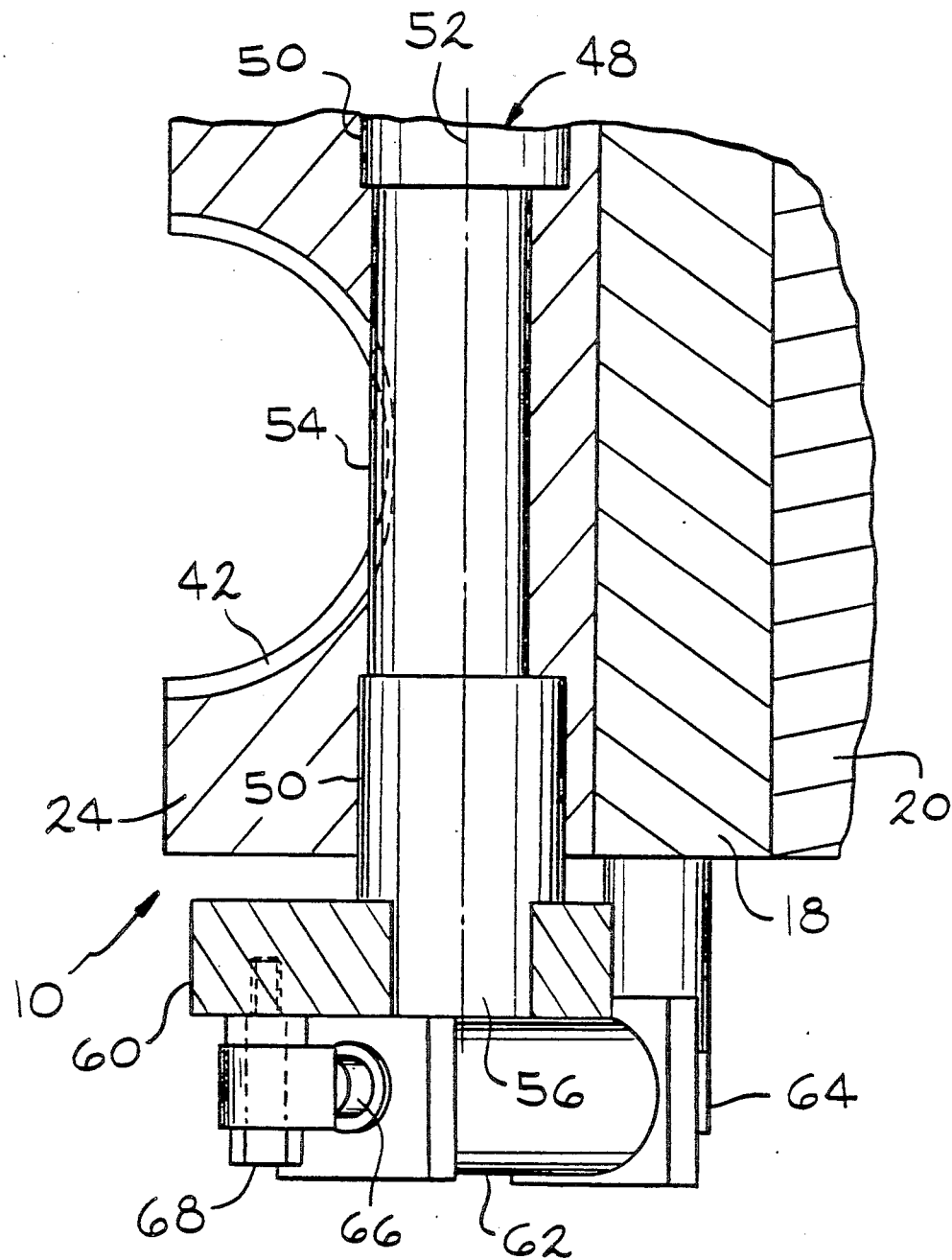
FIG. 4 is a sectional view of the injection mold as seen from substantially the line 4—4 of FIG. 3.

The core rod is locked in place by rotating the cam shafts 48 to a lock position shown in FIG. 3 in which the cams 54 engage the bottom portion of the recesses. At the bottom portion of the recess, the surface of the recesses is upwardly facing, away from the distal end 17 of the core rod. In the lock position, the cams hold the core rod against the surface 42 of the centering blocks. Longitudinal movement of the core rod from the mold cavity is prevented.

Rotation of the cam shafts is described presently. At least one axial end 56 of the cam shafts extends transversely beyond the core rod centering blocks 24 and is formed with two flat sides 58. Cam activator arms 60 are provided with apertures having flat sides corresponding to the cam shaft ends. Hydraulic cylinders 62 are pivotally mounted to the permanent tooling 18 by pivots 64. The piston rods 66 of the cylinders are coupled to the cam activator arms by pivots 68. Pivots 68 are radially spaced from the longitudinal axes 52 of the cam shafts such that as the piston rods 66 are retracted or extended from the cylinders 62, the arms 60 rotate about the axes 52 and rotate the cam shafts.

In the locked position, a force applied to the cams by the core rod will act along a line normal to a tangent to the cam at the contact line with the recesses. Since the recesses 70 are concentric about the axes 52 and the cams 54 are tangent to the recesses at the lines of contact, the forces applied to the cam by the core rod will act radially through the axes 52. As a result, there will be minimal rotational moment applied to the cam shafts by the core rod. During subsequent injection molding, minimal pressure is needed within the cylinders 62 to maintain the cam shafts in the locked positions holding the core rod in place.

Once a preform 78 has been molded, the piston rods of the cylinders 62 are extended, rotating the cam shafts back to the release positions. The core 16 can now begin to retract from the injection mold by moving in the opposite direction of arrow 30. Once the core rod surface that forms the interior surface of the preform sidewall 34 and bottom wall 36 is no longer in contact with the preform 78, the two mold halves are separated from one another. The preform can then be transported to the conditioning stations prior to being transported to the blow station and subsequently stretch blown into a final shape. The rotating cam shafts provide a simple, yet effective locking mechanism to hold the core rod in place during injection molding.

The cam shafts and the recesses extend transversely in a direction parallel to the faces 23 at the mold halves which defines the parting plane of the mold assembly.

It is to be understood that the invention is not limited to the exact construction illustrated and described above, but that various changes and modifications may be made without departing from the spirit and scope of the invention as defined in the following claims.

I claim:

1. Lock mechanism for holding a core rod in place in an injection mold cavity for molding an elongated hollow body having a closed lower end and an open upper end, said lock mechanism resisting longitudinal movement of said core rod in response to injection pressure in said mold tending to force said rod from said mold cavity, said lock mechanism comprising:
    a concave recess in said core rod above said article open upper end forming a camming surface;
    a cam engaging a portion of said camming surface in line contact when said injection mold is closed, said cam being rotatable to move the line of contact from an upper portion of said camming surface facing said mold cavity to a lower portion of said camming surface facing away from said mold cavity.

2. A lock mechanism, in an injection mold assembly having two mold halves closable to define a mold cavity, for holding a core rod having a distal end in place in an injection mold cavity to prevent movement of said rod in a direction away from said cavity comprising:
    a concave recess in the surface of said core rod having a first portion defining a surface generally facing toward said distal end and a second portion defining a surface generally facing away from said distal end;
    a cam movable into engagement with a portion of the surface of said recess upon closing of said mold halves;
    means for rotating said cam between a release position engaging the first portion of said recess surface and a lock position engaging the second portion of said recess surface; and
    the surface of said concave recess being arcuate in the shape of a partial cylinder which when the mold halves are closed is concentric about the axis of rotation of said cam.

3. The lock mechanism of claim 2 wherein said moving means includes a lever arm coupled to a cam shaft of which said cam is a part thereof and a linear actuator having an extendable and retractable piston rod pivotally coupled to said lever arm a radial distance from the axis of rotation of said cam shaft whereby upon extension or retraction of said piston rod, said lever arm and said cam shaft are rotated.

4. The lock mechanism of claim 3 comprising a pair of said recesses with said recesses being on opposite sides of said core rod and a pair of said cams with each cam carried by a cam shaft in each mold half.

5. In a mold assembly for injection molding elongated hollow articles having a closed lower end and an open upper end, said mold assembly including a pair of mold halves laterally separable along a plane parallel to the longitudinal center line of said elongated article, said mold halves when closed defining a cavity open at an upper end and said mold assembly further including a core rod longitudinally movable into and out of said cavity through said upper end to define an interior space corresponding to said hollow article between said core rod and said mold halves, a locking mechanism to hold said core rod in place comprising:
    a pair of concave recesses in the exterior surface of said core rod above said interior space, said recesses extending transverse to said longitudinal axis and parallel to the plane of separation of said mold halves;

a pair of cam shafts extending parallel to said recesses with one shaft disposed in each of said mold halves and each shaft being rotatable about the longitudinal axis of each shaft, each shaft having an eccentric cam portion engagable with the surface of said recesses in line contact when said mold halves are closed, said cam shafts being rotatable to move the lines of contact of said cam portions with said recesses between an upper portion of said recesses and a lower portion of said recesses.

* * * * *